(12) United States Patent
Kim (10) Patent No.: US 9,378,541 B2
(45) Date of Patent: Jun. 28, 2016

(54) IMAGE-QUALITY IMPROVEMENT METHOD, APPARATUS, AND RECORDING MEDIUM

(71) Applicant: SAMSUNG ELECTRONICS CO., LTD., Suwon-si (KR)

(72) Inventor: Dong-hyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/322,154

(22) Filed: Jul. 2, 2014

(65) Prior Publication Data

US 2015/0010245 A1 Jan. 8, 2015

(30) Foreign Application Priority Data

Jul. 2, 2013 (KR) .................. 10-2013-0077294

(51) Int. Cl.
G06K 9/00 (2006.01)
G06K 9/40 (2006.01)
G06T 5/00 (2006.01)

(52) U.S. Cl.
CPC ............. G06T 5/005 (2013.01); G06T 5/002 (2013.01); G06T 5/003 (2013.01); G06T 5/004 (2013.01)

(58) Field of Classification Search
CPC .................. G06T 5/001–5/005; G06T 5/50
USPC .................. 382/167, 254, 274, 275
See application file for complete search history.

(56) References Cited

U.S. PATENT DOCUMENTS

| | | | |
|---|---|---|---|
| 6,762,769 B2 | 7/2004 | Guo et al. | |
| 2006/0171598 A1* | 8/2006 | Lebowsky et al. | 382/232 |
| 2007/0009167 A1* | 1/2007 | Dance et al. | 382/254 |
| 2008/0013849 A1* | 1/2008 | Chouly et al. | 382/254 |
| 2008/0089606 A1* | 4/2008 | Patnaik | 382/275 |
| 2008/0118169 A1* | 5/2008 | Sohm et al. | 382/247 |
| 2008/0199095 A1* | 8/2008 | Kansal | 382/254 |
| 2011/0044558 A1* | 2/2011 | Clediere | 382/275 |
| 2012/0086850 A1 | 4/2012 | Irani et al. | |
| 2012/0328210 A1* | 12/2012 | Fattal et al. | 382/264 |

* cited by examiner

*Primary Examiner* — Yubin Hung
(74) *Attorney, Agent, or Firm* — Sughrue Mion, PLLC (57) ABSTRACT

Provided are an apparatus and method for improving image quality, by generating a first image and a second image, detecting pixels from the second image based on a difference between a value of the at least one second pixel and a value of at least one input pixel from the input image, by comparing the second image to the input image, and changing the value of the at least one input pixel in the input image by using a value of the at least one first pixel in the first image, which is located in a location that corresponds to a location of the detected at least one second pixel in the second image.

21 Claims, 8 Drawing Sheets

IMAGE-QUALITY IMPROVEMENT METHOD, APPARATUS, AND RECORDING MEDIUM

RELATED APPLICATIONS

This application claims the benefit of Korean Patent Application No. 10-2013-0077294, filed on Jul. 2, 2013, in the Korean Intellectual Property Office, the disclosure of which is incorporated herein in its entirety by reference.

BACKGROUND

1. Field

One or more exemplary embodiments relate to an image improvement method, and more particularly, to a method of improving image quality by restoring a lost signal element of an image.

2. Description of the Related Art

As an image-acquiring technology has been advanced and a display apparatus has been developed recently, there is an increasing demand for a high-quality image acquiring technology. As a method of acquiring a high-quality image, diverse researches are conducted for a technology to restore a loss of an image signal, which may occur in an image processing process.

Conventionally, in order to restore a loss of an image signal, a method of strengthening remaining signals has been employed. In the case of a method of strengthening remaining signals, detailed signal elements may not be generated. Additionally, noise may be emphasized, or an image may become visually unnatural.

SUMMARY

One or more exemplary embodiments include a method, an apparatus, and a recording medium for improving image quality of an image signal by restoring a lost signal element of the image signal that is generated in an image processing process.

Additional aspects will be set forth in part in the description which follows and, in part, will be apparent from the description, or may be learned by practice of the exemplary embodiments.

According to one or more exemplary embodiments, an image-quality improvement method includes generating a first image, and a second image detecting at least one second pixel from the second image based on a difference between a value of the at least one second pixel and a value of at last one input pixel from the input image, by comparing the second image to the input image, and changing the value of the at least one input pixel in the input image by using a value of the at least one first pixel in the first image, which is located in a location that corresponds to a location of the detected at least one second pixel in the second image.

The generating may include determining a degree in which a high-frequency element of the first image is reduced based on the input image.

The detecting may include detecting at least one second pixel and at least one input pixel, where the value of the at least one second pixel and the value of the at least one input pixel is less than a preset reference value.

The detecting may also include specifying a plurality of input pixels in a first domain having a preset size in the input image and a plurality of second pixels in a second domain having a preset size in the second image, and the preset sizes of the first domain and the second domain are the same.

The detecting may further include determining the specified plurality of input pixels in the first domain and the specified plurality of second pixels in the second domain which correspond to each other, and determining whether a sum of differences of a value between the at least one second pixel and the value of the corresponding at least one input pixel is less than a preset reference value, where the specified plurality of input pixels in the first domain and the specified plurality of second pixels in the second domain are located at a corresponding location in the first domain and the second domain.

The detecting may further include moving the second domain having the preset size in the second image, and the plurality of second pixels in the moved second domain and the plurality of input pixels in the first domain of the input image are compared to each other.

The changing may include determining the detected at least one second pixel in the second image which correspond to the at least one first pixel in the first image, extracting a value of the at least one second pixel which has a highest frequency of occurrence from among the at least one corresponding pixel in the first image, and determining a value of the at least one input pixel in the input image by using an extracted value of the at least one second pixel.

The determining the value of the at least one input pixel may include c the value of the at least one input pixel in the input image to the extracted value of the at least one second pixel.

The determining the value of the at least one input pixel may include changing the value of the at least one input pixel in the input image to a weight value that is obtained by applying a preset weight factor to the value of the at least one input pixel and the extracted value of the at least one second pixel.

The determining the value of the at least one input pixel may include changing the value of the at least one input pixel in the input image by using a high-frequency element that is extracted from the at least one first pixel in the first image and the at least one second pixel in the second image, which corresponds to the at least one first pixel in the first image.

The first image is obtained by downsizing an input image.

The second image is obtained by reducing a high-frequency element of the first image.

A non-transitory computer-readable medium having stored thereon a computer program, which when executed by a computer, may perform the image-quality improvement method.

According to one or more exemplary embodiments, an image-quality improvement apparatus includes a generator configured to generate a first image and a second image a detector configured to detect at least one second pixel based on a difference between a value of the at least one second pixel and a value of the at least one input pixel from the input image, by comparing the second image to the input image, and an image-quality improvement unit configured to change the value of the at least one input pixel in the input image by using a value of the at least one first pixel in the first image, which is located in a position that corresponds to a location of the detected at least one second pixel in the second image.

The generator may be configured to determine a degree in which a high-frequency element of the first image is reduced based on the input image.

The detector may be configured to detect at last one second pixel and at least one input pixel, where the value of the at least one second pixel and the value of the at least one input pixel is less than a preset reference value.

The detector may be configured to specify a plurality of input pixels in a first domain having a preset size in the input image and a plurality of second pixels in a second domain having a preset size in the second image, and the preset sizes of the first domain and the second domain are the same.

The detector may be configured to determine the specified plurality of input pixels in the first domain and the specified plurality of second pixels in the second domain which correspond to each other, and determine whether a sum of differences of the value of the at least one second pixel and the value of the corresponding at least one input pixel is less than a preset reference value, where the specified plurality of input pixels in the first domain and the specified plurality of second pixels in the second domain are located at a corresponding location in the first domain and the second domain.

The detector may be configured to move the second domain having the preset size in the second image, wherein the plurality of second pixels in the moved second domain and the plurality of input pixels the first domain of the input image are compared to each other.

The image-quality improvement unit may include a correspondence unit configured to determine the detected at least one second pixel in the second image which correspond to the at least one first pixel in the first image, an analyzer configured to extract a value of the at least one second pixel which has a highest frequency of occurrence from among the at least one corresponding pixel in the first image, and a determination unit configured to determine a value of the at least one input pixel in the input image by using an extracted value of the least one second pixel.

The determination unit may be configured to change the value of the at least one input pixel in the input image to the extracted value of the at least one second pixel.

The determination unit may be configured to change the value of the at least one input pixel in the input image to a weight value that is obtained by applying a preset weight factor to the value of the at least one input pixel in the input image and the extracted value of the at least one second pixel.

The determination unit is configured to change the value of the at least one input pixel in the input image by using a high-frequency element that is extracted from the at least one first pixel in the first image and the at least one second pixel in the second image, which corresponds to the at least one first pixel in the first image.

The first image is obtained by downsizing an input image.

The second image is obtained by reducing a high-frequency element of the first image.

According to another exemplary embodiment, an image-quality improvement apparatus may include a generator configured to generate a first image and a second image, a detector configured to compare at least one from among the first image the second image with an input image, and an image-quality improvement unit configured to change at least one pixel in the input image, where the first image and the second image are generated from the first image.

The first image is obtained by downsizing the input image.

The second image is obtained by reducing a high-frequency element of the first image.

A predetermined area of the input image may be compared to a corresponding area of the second image.

The at least one pixel to be changed may be determined if the difference of a value of a pixel in the predetermined area of the input image and a value of a corresponding pixel in the corresponding area of the second image is less than a preset reference value

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the exemplary embodiments are merely described below, by referring to the figures, to explain aspects of the present description. Any modifications, variations or replacement that can be easily derived by those skilled in the art from the detailed description and the exemplary embodiments should fall within the scope of the exemplary embodiments.

Hereinafter, the term "unit" refers to a software component, or a hardware component such as FPGA or ASIC, and performs a certain function. However, the "unit" is not limited to software or hardware. The "unit" may be configured in an addressable storage medium and may be configured to be executed by one or more processors. Hence, the "unit" includes elements such as software elements, object-oriented software elements, class elements, and task elements, and processes, functions, attributes, procedures, subroutines, segments of program codes, drivers, firmware, micro-codes, circuits, data, databases, data structures, tables, arrays, and variables. The functions provided in the elements and the units may be combined into a fewer number of elements and units or may be divided into a larger number of elements and units.

Figure 1:
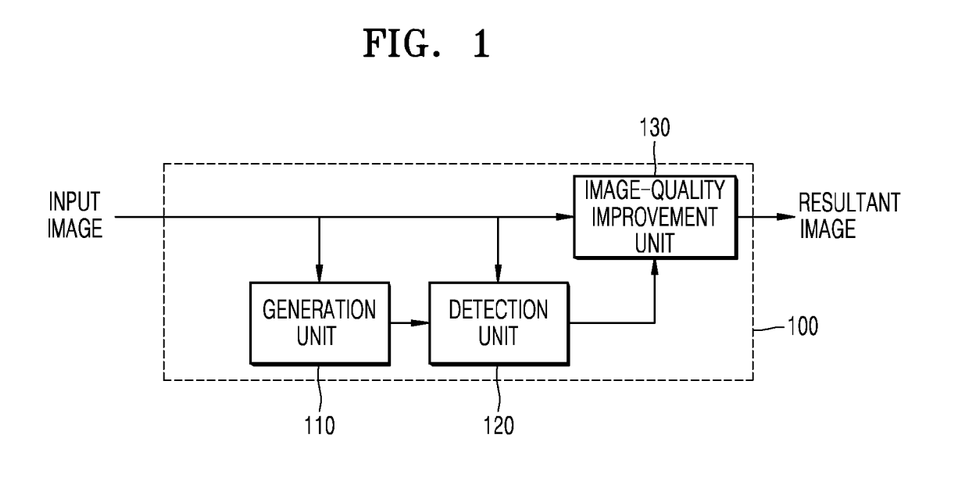
FIG. 1 is a block diagram for explaining an image-quality improvement apparatus according to an exemplary embodiment.

FIG. 1 is a block diagram for explaining an image-quality improvement apparatus 100 according to an exemplary embodiment.

Referring to FIG. 1, the image-quality improvement apparatus 100 may receive an input image. The input image may include an image of which a signal element is lost, compared to an original image, after the image goes through an image processing process such as compression or post-processing. The input image may include, for example, a TV broadcasting image, a blue-ray image, and a digital versatile disc (DVD) image.

If a signal element is lost after an image goes through the image processing process, the image may be blurred. The lost signal element may include a high-frequency element of the image. If the high-frequency element is lost, an edge of an image becomes unclear, and thus, a detailed part of the image may not be presented.

In order to restore the lost signal element of the input image, a method of adding a signal element, which is similar to the lost signal element, to the input image may be employed. According to an exemplary embodiment, a signal element, which is similar to the lost signal element, is generated based on a first image that is obtained by downsizing the input image, and a second image that is obtained by reducing a high-frequency element of the first image.

As a result of downsizing the input image, the first image, of which an edge is clear and sharp compared to the input image, may be obtained. If the input image is compared directly to the first image, an error may occur in restoring the signal element, due to a difference in image characteristics between the input image and the first image.

Accordingly, the input image may be compared to the second image that is obtained by reducing a high-frequency element of the first image, and thus, has similar characteristics to the input image. For example, a similar pixel, which has a pixel value similar to a value of a pixel to be restored in the input image, is detected from the second image. Then, by using a candidate pixel in the first image that corresponds to the detected similar pixel in the second image, a high-frequency element of the input image may be improved.

In other words, instead of comparing the first image, which became sharper than the input image through an image-downsizing process, directly to the input image, the second image that is obtained by reducing a high-frequency element from the first image is compared to the input image. Thus, a pixel, which is highly similar to the pixel to be restored in the input image, may be accurately detected. The pixel to be restored is a pixel of which a lost signal element is to be restored through a process according to an exemplary embodiment. A quality of the input image may be improved by applying the process according to an exemplary embodiment to all pixels in the input image.

Referring to FIG. 1, the image-quality improvement apparatus 100 may include a generation unit (i.e., generator) 110, a detection unit (i.e., detector) 120, and an image-quality improvement unit 130.

The generation unit 110 may generate a first image that is obtained by downsizing the input image, and a second image that is obtained by reducing a high-frequency element of the first image. For example, the generation unit 110 may equalize the first image by reducing a high-frequency element of the first image.

The image-quality improvement apparatus 100 may receive an image in which a signal element is lost through an image processing process such as compression or post-processing, compared to an original image.

As an example, the image-quality improvement apparatus 100 may receive an image that is obtained by applying a blur filter, such as a bilateral filter, to an original image. If a blur filter is applied to the original image, noise may be removed, and an edge of an image may be smoothed. However, detailed portions, such as an edge in an image, may not be clearly expressed. When an image is input to the image-quality improvement apparatus 100, a high-frequency element of the image may be processed through the image processing process. Thus, an edge of the image may not be clear compared to an edge in the original image.

According to an exemplary embodiment, in order to clearly express an edge in the input image, an image signal, which is similar to a lost image signal, may be generated, so as to improve image quality. According to an exemplary embodiment, a signal element that is similar to the lost signal element may be generated, based on a first image that is obtained by downsizing the input image. A method of downsizing an input image may be performed by applying a blur filter, such as a Gaussian filter, to the input image so as to blur the input image, and downsampling the input image at a predetermined ratio.

If an input image is downsized, an image may be sharpened. According to an exemplary embodiment, a high-frequency element of the first image is reduced so as to make characteristics of the first image, which is sharpened compared to the input image, similar to the input image. By comparing the second image, which is obtained by reducing a high-frequency element from the first image to the input image, a pixel that is highly similar to the pixel to be restored in the input image may be accurately detected.

According to an exemplary embodiment, a high-frequency element of the first image may be reduced based on a preset value. The preset value may vary according to a setting made by a user.

In order to clearly express a detailed portion of the input image, a degree in which a high-frequency element is reduced from an original image may be analyzed by comparing the input image to the original image. For example, if a blurred original image is used as an input image, a first image may be blurred to the same degree as the original image.

A method of analyzing a degree, in which a high-frequency element is processed, is not limited thereto. A degree in which a high-frequency element is reduced may be checked by receiving data regarding a parameter value that is applied to an input image in the image processing process.

The detection unit 120 may compare the second image to the input image, and thus, detect pixels from the second image based on a difference between values of pixels of the respective images. For example, similar pixels, which have a value difference less than a preset reference value from a value of the pixel to be restored in the input image, may be detected from pixels that constitute the second image.

The input image and the second image may be compared to each other, so as to detect the similar pixels in the second image. Since the input image and the second image have a different size from each other, the similar pixels may be detected by corresponding pixels in a domain with a preset size in respective images.

According to an exemplary embodiment, the detection unit 120 may compare pixels in a first domain with a preset size, which includes the pixel to be restored in the input image, to pixels in a second domain with a preset size in the second image. Thus, similar pixels, which have a value difference less than a preset reference value from a value of the pixel to be restored in an input image, may be detected. The first domain and the second domain may be the same size.

In detail, a patch may be used to detect similar pixels, which have a value difference less than a preset reference value from a value of the pixel to be restored in the input image, by comparing the input image to a second image that has a different size from the input image. The patch may include pixels in a domain with a preset size, which includes the pixel to be restored in the input image. As an example, if a patch with a size of 3×3 is used, nine pixels including a current pixel may be specified in a first domain in the input image. Additionally, in the second image, nine pixels in the second domain may be specified by using a patch of 3×3.

According to an exemplary embodiment, the nine pixels that are specified in the input image and the nine pixels that are specified in the second image correspond to each other. Accordingly, it may be determined whether a sum of differences between values of the respective corresponding pixels is less than a preset reference value. The corresponding pixels may include pixels that are placed at the same location in a domain in each patch. In other words, the corresponding pixels may include pixels having coordinates which are the same in each patch, with regard to pixels included in a patch in the input image and pixels included in a patch in the second image.

According to an exemplary embodiment, in order to detect similar pixels, a patch may be applied to all pixels that constitute the second image. As an example, if a patch in the second image is moved in a certain direction, pixels in the moved patch in the second image and pixels in a patch in the input image may correspond to each other. A searching scope in which a patch is moved in the second image is not limited to the entire second image.

According to an exemplary embodiment, a user may limit a searching scope to a certain scope. Additionally, a searching scope of a patch may be specified in consideration of characteristics of the input image.

As an example, as the input image is analyzed, an area in which a difference between values of pixels that constitute the input image is equal to or higher than a threshold, is assumed to be an edge. If the pixel to be restored is located in the area that is assumed as an edge, a searching scope of a patch may be set to be relatively large. On the contrary, if the pixel to be restored is not located in the area that is assumed as an edge, a searching scope of a patch may be set to be relatively narrow. With regard to the area that is assumed as an edge, a searching scope may be determined in consideration of an orientation of the edge.

The image-quality improvement unit 130 may restore a lost signal element of the pixel to be restored, by using a value of the candidate pixels in the first image, which corresponds to the similar pixels in the detected second image. The candidate pixels that corresponds to the similar pixels may include pixels that have the same coordinate value in each image. In other words, the candidate pixels may include pixels that are located at the same position, with regard to the first image and the second image that have the same size.

According to an exemplary embodiment, the image-quality improvement unit 130 corresponds the similar pixels detected by the detection unit 120, the similar pixels having similar characteristics to the pixel to be restored in an input image, to pixels in a first image. Based on a result of the corresponding, candidate pixels in the first image are extracted. Then, by analyzing a value of the extracted candidate pixels in the first image, an optimum pixel value that has the highest frequency of occurrence may be determined.

The lost signal element may be restored by adding a value of the determined optimum pixel value to a value of the pixel to be restored in the input image. A method of adding a value of the optimum pixel value to a value of the pixel in the input image is described in detail by referring to FIG. 3.

Figure 2:
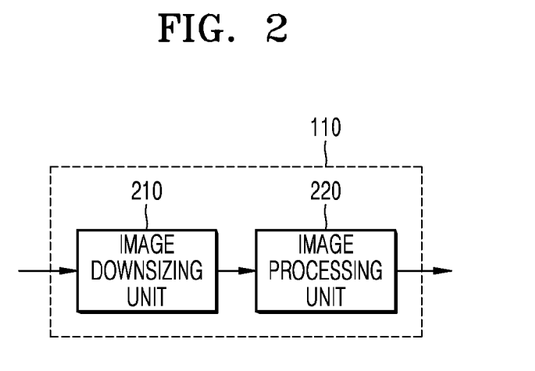
FIG. 2 is a block diagram for explaining a generation unit, included in the image-quality improvement, according to an exemplary embodiment.

FIG. 2 is a block diagram for explaining the generation unit 110 included in the image-quality improvement apparatus 100 according to an exemplary embodiment.

Referring to FIG. 2, the generation unit 110 may include an image downsizing unit 210 and an image processing unit 220.

The image downsizing unit 210 may generate a first image that is obtained by downsizing an input image. As a result of downsizing the input image, the first image which is sharper than the input image may be obtained.

According to an exemplary embodiment, downsampling is performed to downsize the input image. Downsampling is a process of expressing an image as a smaller sample than an original sample. In other words, downsampling is a method of downsizing an image at a ratio of less than 1. A downsizing ratio may be determined in consideration of characteristics of an input image such as complexity of the input image or a digital apparatus for playing the input image. Even if the input image is downsized, a form of an input image signal may be maintained, according to a fractal theory in which a small structure is endlessly repeated in the form similar to an entire structure.

The image processing unit 220 generates a second image which is obtained by reducing a high-frequency element of the first image that is generated by the image-downsizing unit 210. Reducing a high-frequency element is a process of equalizing an image, and may be executed by performing blurring. However, blurring is just one exemplary embodiment of a method of processing a high-frequency element, and exemplary embodiments are not limited thereto.

By processing the high-frequency element of the first image that became sharper than the input image, a second image that has similar characteristics to the input image may be generated. According to an exemplary embodiment, in order to generate a second image that has similar characteristics to the input image, a degree of reducing the high-frequency element of the first image based on the input image is determined.

According to an exemplary embodiment, the high-frequency element of the first image may be reduced by a preset value. The predetermined value may vary according to a setting made by a user.

In order to clearly express a detailed portion of an input image, a degree in which the high-frequency element is reduced from the original image may be analyzed by comparing the original image to the input image. As an example, if a blurred original image is used as the input image, a first image is blurred to a same degree as the original image.

A method of analyzing a degree in which the high-frequency element is processed is not limited thereto. The degree in which the high-frequency element is processed may also be checked by receiving data regarding a parameter value which is applied to the input image in the image-processing process.

Figure 3:
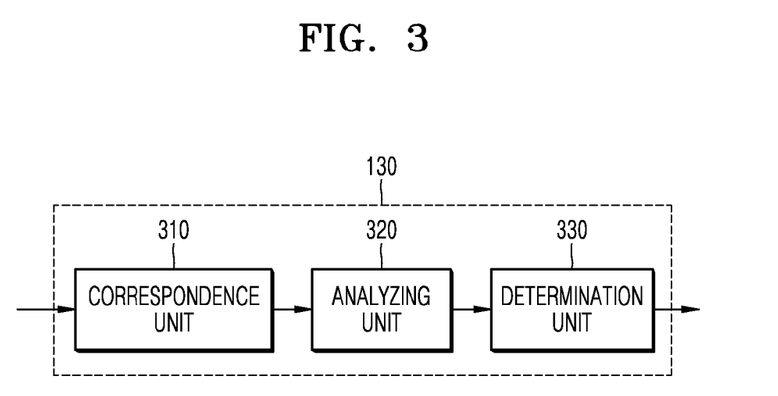
FIG. 3 is a block diagram for explaining an image-improvement unit, included in the image-quality improvement, according to an exemplary embodiment.

FIG. 3 is a block diagram for explaining the image-quality improvement unit 130 included in the image-quality improvement apparatus 100 according to an exemplary embodiment.

Referring to FIG. 3, the image-quality improvement unit 130 may include a correspondence unit 310, an analyzing unit (i.e., analyzer) 320, and a determination unit 330.

The correspondence unit 310 may correspond the similar pixels in the second image, which is detected by the detection unit 120, to the pixels in the first image. A lost signal element of the pixel to be restored in the input image may be detected from the candidate pixels in the first image that correspond to the similar pixels in the second image. The candidate pixels that correspond to the similar pixels may include pixels of which coordinate values are the same in the respective image.

In other words, the corresponded images may include pixels which are located at the same position in the first image and the second image that have the same size.

The analyzing unit 320 may extract an optimum pixel value that has the highest frequency of occurrence among values of the corresponded candidate pixels in the first image. The optimum pixel value may include the lost signal element of the pixel to be restored.

However, a method of extracting the optimum pixel value is not limited to selecting a value of the most frequent pixel. As an example, values of pixels having a frequency of occurrence equal to or higher than a preset value may be extracted and an average of the extracted pixel values may be used to restore a signal element of the pixel to be restored.

The determination unit 320 may determine a value of the pixel to be restored, by using the extracted optimum pixel value. According to an exemplary embodiment, a value of the pixel to be restored may be changed to the extracted optimum pixel value. However, a method of determining a value of the pixel to be restored is not limited thereto.

According to an exemplary embodiment, a value of a pixel to be restored may be determined by using a value that is obtained by applying a preset weight factor to the value of the pixel to be restored and the extracted optimum pixel value.

As a result of analyzing the input image, if it is determined that the pixel to be restored is included in an edge area, a weight factor of the optimum pixel value may be set to be higher than a weight factor of a value of the pixel to be restored. This is because it is expected that a loss of the high-frequency element is relatively great in the edge area.

As a result of the analyzing of the input image, an area in which a difference between values of pixels that constitute the input image being equal to or greater than a threshold may be assumed to be an edge.

As a result of the analyzing of the input image, if it is determined that the pixel to be restored is not included in the edge area, a weight factor of the value of the pixel to be restored may be set to be equal to or higher than a weight factor of the optimum pixel value. This is because if the pixel to be restored is not in the edge area, it is expected that a loss of the high-frequency element is relatively small.

According to an exemplary embodiment, a signal element of the pixel to be restored may be restored using a high-frequency element that is extracted based on the candidate pixel of the first image having the extracted optimum pixel value and the similar pixel of a second image that corresponds to the candidate pixel of the first image. The high-frequency element may include a difference between values of the candidate pixel of the first image and the similar pixel of the corresponding second image.

A lost signal element of the pixel to be restored may be restored by adding a difference element between the candidate pixel of the first image, which has the optimum pixel value and the corresponding similar pixel of the second image. For example, a high-frequency element may be added to a value of the pixel to be restored.

Figure 4:
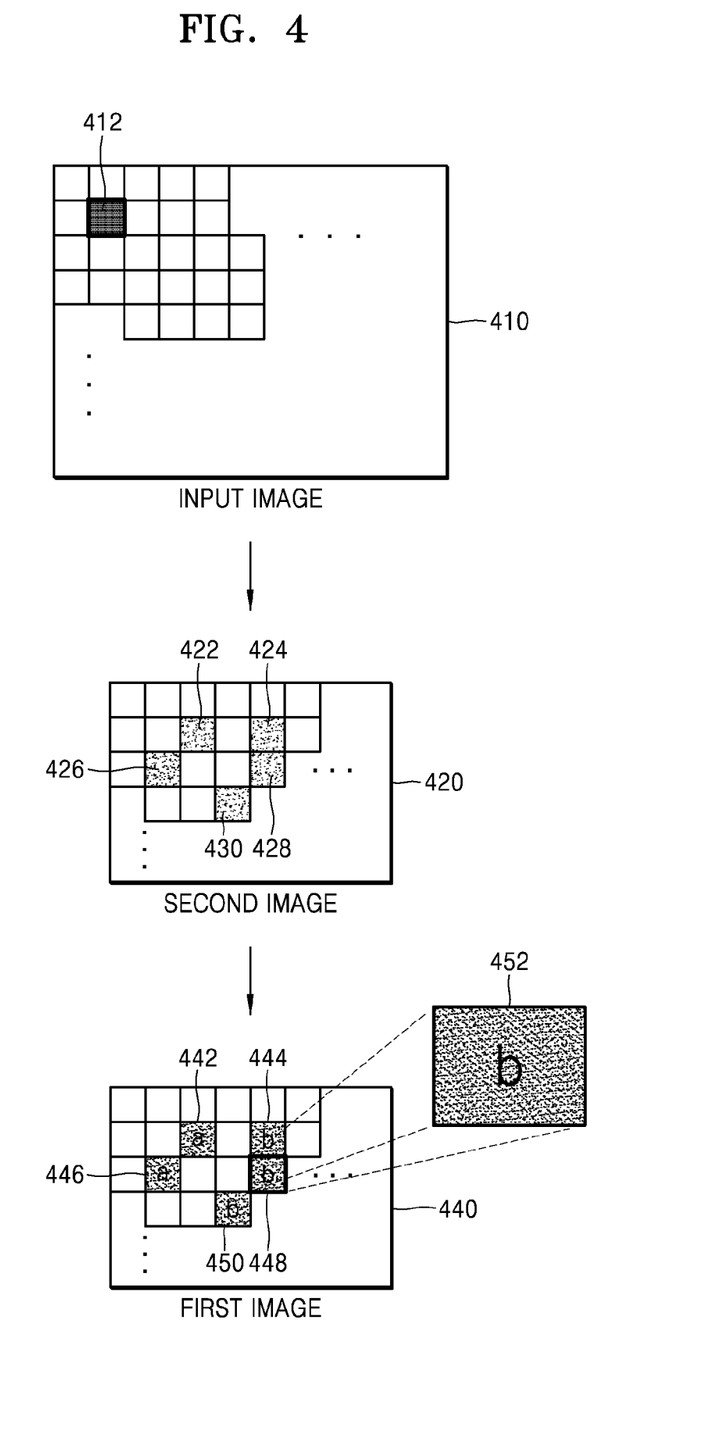
FIG. 4 is a diagram for explaining a process of changing a value of a pixel of an input image according to an exemplary embodiment.

FIG. 4 is a diagram for explaining a process of restoring a lost signal element of a pixel to be restored 412 in an input image 410 according to an exemplary embodiment.

Referring to FIG. 4, with regard to pixels that constitute a second image 420, similar pixels, which have a value different from a value of the pixel to be restored 412 that is less than a preset reference value, may be detected.

In order to detect the similar pixels in the second image 420, the input image 410 and the second image 420 may be compared to each other. Since the input image 410 and the second image 420 have a different size, the similar pixels may be detected by corresponding pixels in a domain with a preset size equal to each other. According to an exemplary embodiment, a patch may be used to detect the similar pixels, by comparing the input image 410 to the second image 420 that has a different size from the input image 410.

According to an exemplary embodiment, if a patch with a size of 3×3 is used, nine pixels that includes the pixel to be restored 412 and nine pixels in the patch with a size of 3×3 may respectively correspond to each other.

Figure 5A:
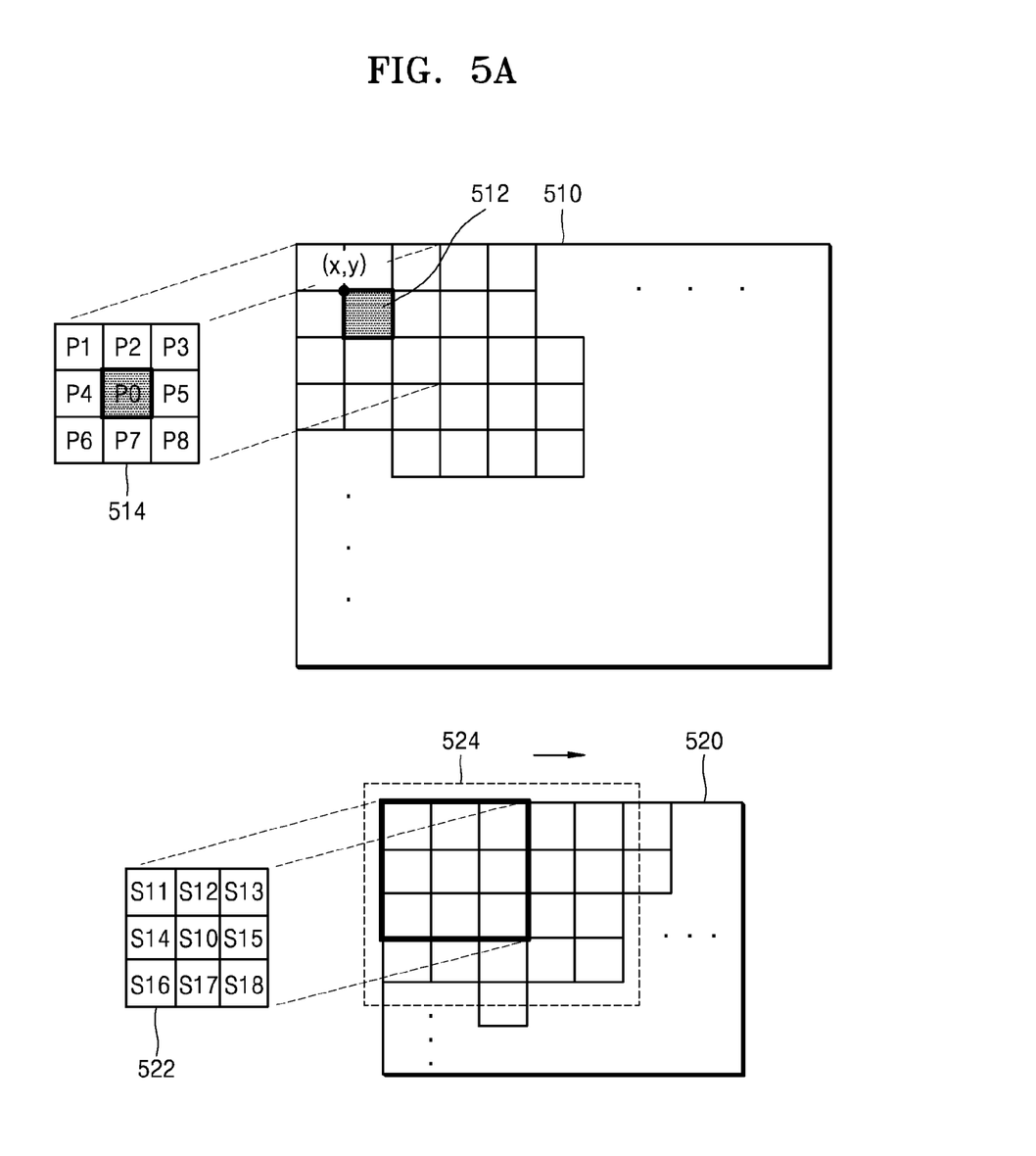
FIG. 5A is a diagram for explaining a process of detecting a pixel in a second image, of which pixel value has a difference of equal to or less than a reference value from a pixel in an input image, according to an exemplary embodiment.

FIG. 5A is a diagram for explaining a process of detecting similar pixels, in a second image 520, where the difference of the similar pixels value is less than a reference value from a pixel to be restored P0 in an input image 510, according to an exemplary embodiment.

Referring to FIG. 5A, nine pixels may be included in a first domain with a 3×3 patch 514 in the input image 510. For example, the nine pixels may include the pixel to be restored P0 and eight pixels P1 through P8, having the pixel to be restored P0 located at a center. Nine pixels S10 through S18 may be included in a second domain in a patch 522 of the second image 520, to correspond to the nine pixels in the patch 514 of the input image 510.

According to an exemplary embodiment, a sum of differences between values of the corresponding pixels in the respective domains of patch 514 and patch 522 may be derived from Equation 1 shown below.

$$|P0-S10|+|P1-S11|+|P2-S12|+|P3-S13|+|P4-S14|+ \\ |P5-S15|+|P6-S16|+|P7-S17|+|P8-S18| \leq Vth \quad \text{[Equation 1]}$$

According to an exemplary embodiment, a difference between the values of the corresponding pixels in the respective domains may be obtained. The corresponding pixels may include pixels that are located at the same position in a domain in the respective patches. As an example, P1 and S11 are pixels that correspond to each other.

If a sum of differences between the values of the corresponding pixels is equal to or less than Vth, which is a preset reference value, a pixel that corresponds to a pixel to be restored in a 3×3 patch in the second image 520 may be detected as a similar pixel. In other words, referring to FIG. 5A, if a sum of differences between values of corresponding pixels in the respective patches 514 and 522 is equal to or less than Vth, the pixel S10 may be detected as a similar pixel. By moving a patch in the entire second image 520, pixels corresponding to pixels in the input image 510 may be detected.

Figure 5B:
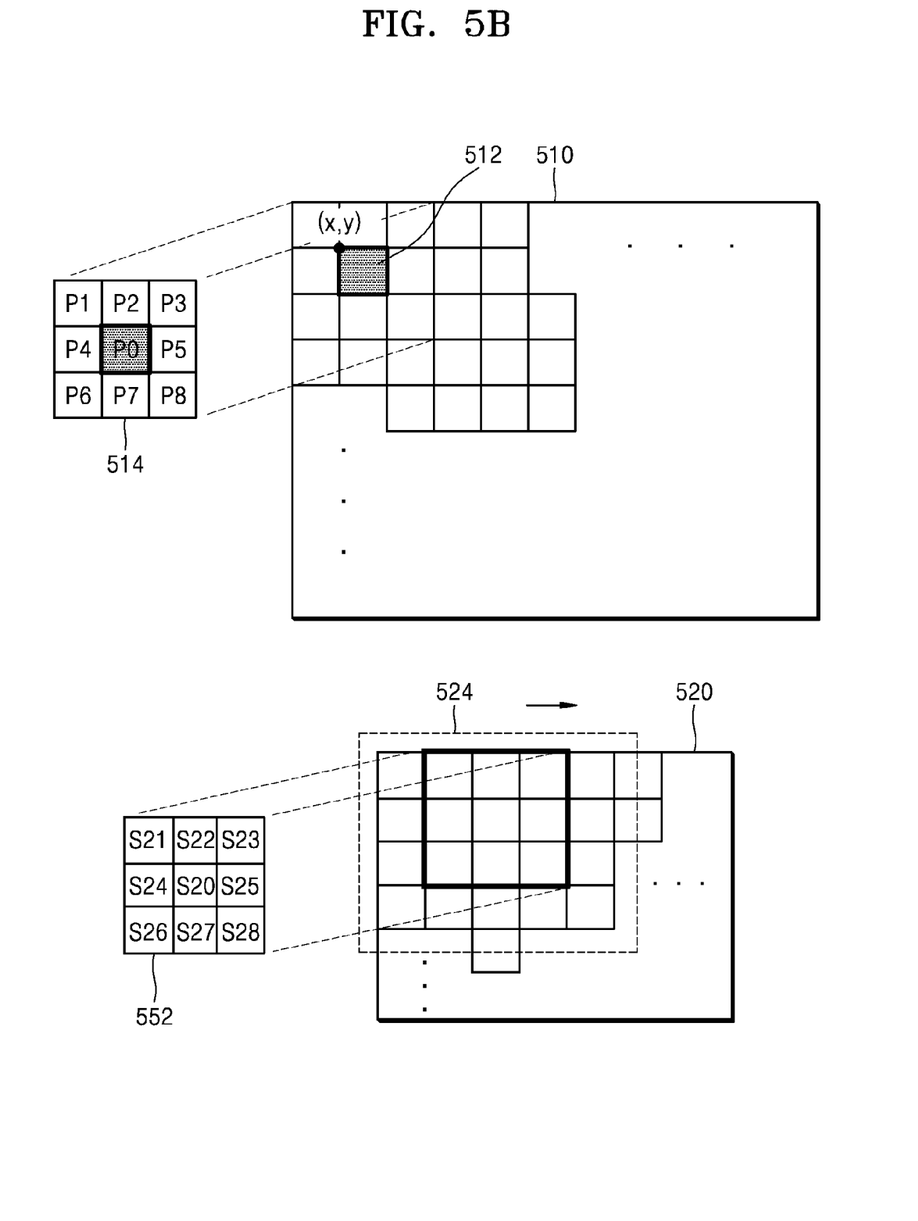
FIG. 5B is a diagram for explaining a process of detecting a pixel in a second image, of which pixel value has a difference of equal to or less than a reference value from a pixel in an input image, according to an exemplary embodiment.

In FIG. 4, by using the same method as described with reference to FIGS. 5A and 5B, similar pixels may be detected by moving a patch in the entire second image 420. As an example, it may be assumed that similar pixels 422, 424, 426, 428, and 430, of which a sum of differences between pixel values is equal to or less than a preset reference value in an entire area of the second image 420, are detected. The detected similar pixels 422, 424, 426, 428, and 430 may correspond to the first image 440. The corresponding pixels may include pixels that are located at the same position in the respective images.

By using values of candidate pixels 442, 444, 446, 448, and 450 in the first image 440, which corresponds to the detected similar pixels 422, 424, 426, 428, and 430, a lost signal element of the pixel to be restored in the input image may be restored.

In detail, an optimum pixel value, which has the highest frequency of occurrence among values of the corresponding candidate pixels 442, 444, 446, 448, and 450 in the first image, may be extracted. According to an exemplary embodiment the optimum pixel value that has the highest frequency of occurrence is most likely to include a signal element that is appropriate for restoring an input image. Thus, the optimum pixel value that has the highest frequency of occurrence is extracted.

Referring to FIG. 4, a value of the first pixel 442 and the third pixel 446 is "a" and a value of the second pixel 444, the fourth pixel 448, and the fifth pixel 450 is "b." In other words, it may be checked that a frequency of occurrence of the pixel value b is higher than a frequency of occurrence of the pixel value a. Accordingly, a value of the pixel to be restored in the input image may be determined by using b, which is an optimum pixel value 452.

As an example, if the optimum pixel value 452 is extracted in the first image, a value of the pixel to be restored may be changed to the extracted optimum pixel value 452. Additionally, the value of the pixel to be restored may be changed to a value that is obtained by applying a preset weight factor to the value of the pixel to be restored and the optimum pixel value 452.

Additionally, a lost signal element of the input image may be restored by using a high-frequency element that is extracted from candidate pixels in the first image that has the extracted optimum pixel value 452 and a corresponding similar pixel in the second image. In detail, the high-frequency element may include a difference of values between the candidate pixel and the corresponding similar pixel.

Values of pixels of which frequency of occurrence is equal to or higher than a preset threshold frequency of occurrence are extracted, and an average of the extracted pixel values may be used to restore a lost signal element of a pixel to be restored. As an example, if a preset threshold frequency of occurrence is 2, referring to FIG. 4, a frequency of occurrence of the pixel value a is 2, and a frequency of occurrence of the pixel value b is 3. Thus, it may be determined that the pixel values have a frequency of occurrence that is equal to or higher than the threshold frequency of occurrence. In this case, a lost signal element of the pixel to be restored in the input image may be restored by calculating an average of pixel values of the corresponding candidate pixels 442, 444, 446, 448, and 450 in the first image.

Referring to FIG. 5A, the input image 510 may include nine pixels in the first domain with a 3×3 patch 514. For example, the input image 510 may include the pixel to be restored P0 and eight pixels P1 through P8 that are located with the pixel to be restored P0 located at a center. The nine pixels S10 through S18 may be included in the second domain in the patch 522 of the second image 520, to correspond to pixels in the patch 514.

According to an exemplary embodiment, a difference between values of corresponding pixels in the respective domains may be obtained. The corresponding pixels may include pixels that are located at the same position in the domain inside each patch. As an example, P1 and S11 are pixels that correspond to each other.

If a sum of differences between values of corresponding pixels is equal to or less than a preset reference value, a pixel that corresponds to a pixel to be restored in a 3×3 patch in the second image 520 may be detected to be a similar pixel. In other words, as shown in FIGS. 5A and 5B, if a sum of differences between values of corresponding pixels in respective patches 514 and 522 is equal to or less than a preset reference value, the pixel S10 may be detected as a similar pixel. By moving a patch in the entire second image 520, pixels corresponding to pixels in the input image 510 may be detected.

By moving a patch in the second image 520, the nine pixels in the second image 520 may determine whether a sum of differences of pixel values in the input image in the whole second image 520 is equal to or less than a reference value. Referring to FIG. 5B, it may be determined that the patch 522 in the second image 520 is moved right by one pixel.

The nine pixels S20 through S28 may also be included in the second domain in the patch 552 of the second image 520, to correspond to pixels in the patch 514 of the input image 510. The patch 552, shown in FIG. 5B, is a result of moving the patch 522, shown in FIG. 5A, right by one pixel. Pixels S21, S24, S26, S22, S20, and S27, shown in FIG. 5B, correspond to pixels S12, S10, S17, S13, S15, and S18 shown in FIG. 5A.

According to an exemplary embodiment, a difference between values of corresponding pixels in each domain may be obtained. The corresponding pixels may include pixels that are located at the same position in a domain in the respective patches. As an example, P1 and S21 are pixels that correspond to each other.

If a sum of differences between values of corresponding pixels is equal to or less than a preset reference value, a pixel that corresponds to a pixel to be restored in a 3×3 patch in the second image 520 may be detected as a candidate pixel. By moving a patch in the whole second image 520, pixels corresponding to pixels in the input image 510 may be detected.

A searching scope in which the patch is moved in the second image is not limited to the entire second image 520. According to an exemplary embodiment, a user may limit a searching scope to within a certain scope. According to an exemplary embodiment, if a coordinate of a pixel in the input image is (x,y), the searching scope 524 of the patch may be limited so that a coordinate of x is equal to or more than x-a, and equal to or less than x+a, and a coordinate of y is equal to or more than y-b, and equal to or less than y+b.

Figure 6:
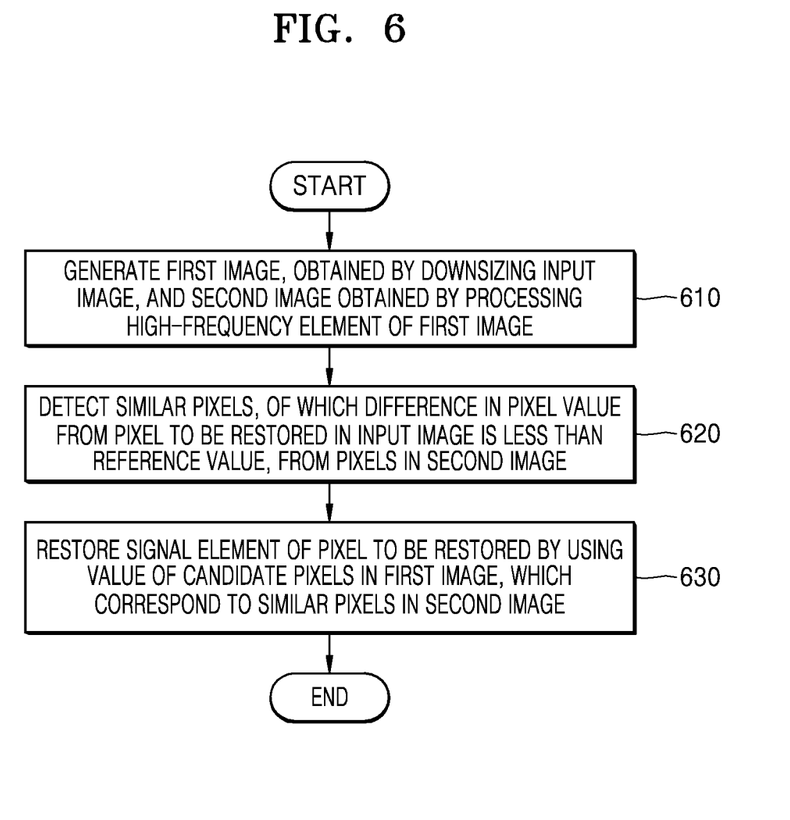
FIG. 6 is a flowchart for explaining an image-quality improvement method according to an exemplary embodiment.

FIG. 6 is a flowchart for explaining an image-quality improvement method according to an exemplary embodiment.

In operation 610, the image-quality improvement apparatus 100 generates a first image by downsizing the input image and a second image by reducing a high-frequency element of the first image. An exemplary embodiment of a method of processing a high-frequency element includes blurring. In detail, a second image may be generated by blurring the first image.

In order to clearly express a detailed portion of the input image, a degree in which a high-frequency element is processed from an original image may be analyzed by comparing the original image to the input image. For example, if an input image is generated by blurring the original image, the first image is blurred to the same degree as the original image.

A method of analyzing a degree in which a high-frequency element is processed is not limited thereto. A degree in which a high-frequency element is reduced may be determined by receiving data regarding a parameter value that is applied to an input image in an image processing process.

In operation 620, the image-quality improvement apparatus 100 detects similar pixels of which values have a difference equal to or less than a reference value from a pixel to be restored in the input image, from among pixels in the second image.

According to an exemplary embodiment, pixels in a first domain with a preset size, which includes a pixel to be restored in the input image, are compared to pixels in a second domain with a preset size in the second image, and thus, similar pixels of which values have a difference therebetween of less than a preset reference value may be detected.

According to an exemplary embodiment, a patch may be used to detect similar pixels of which a value has a difference therebetween of less than a preset reference value. The patch may include pixels in a domain having a preset size, which includes a current pixel in the input image. According to an exemplary embodiment, after corresponding the pixels in the patch of the input image to the pixels in the patch of the second image, it may be determined whether a sum of differences between values of the respective corresponding pixels is less than a preset reference value.

Additionally, by moving a patch in the second image, it may be determined whether a sum of differences between values of pixels in the patch of the second image and values of pixels in the patch of the input image is less than a preset reference value with regard to a preset area in the second image.

In operation 630, the image-quality improvement apparatus 100 may restore a lost signal element of the pixel to be restored, by using a value of the candidate pixels in the first image, which corresponds to the detected similar pixels in the second image. The candidate pixels that correspond to the similar pixels may include pixels that have the same coordinate value in each image. In other words, the candidate pixels may include pixels that are located at the same position in each image.

According to an exemplary embodiment, the similar pixels, detected in operation 620, correspond to pixels in the first image. An optimum pixel value that has the highest frequency of occurrence may be extracted, by analyzing a value of the corresponding pixels in the first image.

The value of the pixel to be restored may be changed by using the extracted optimum pixel value. According to an exemplary embodiment, the value of the pixel to be restored may be changed to the optimum pixel value. Additionally, the value of the pixel to be restored may be changed by using a value that is obtained by applying a weight factor to the pixel to be restored and the optimum pixel value.

The value of the pixel to be restored may be changed by using a high-frequency element that is extracted from a similar pixel in the first image, which has the extracted optimum pixel value, and a candidate pixel in the second image, which corresponds to the similar pixel in the first image. The high-frequency element may include a difference between a value of a candidate pixel of the first image and a value of a similar pixel of the corresponding second image.

Figure 7:
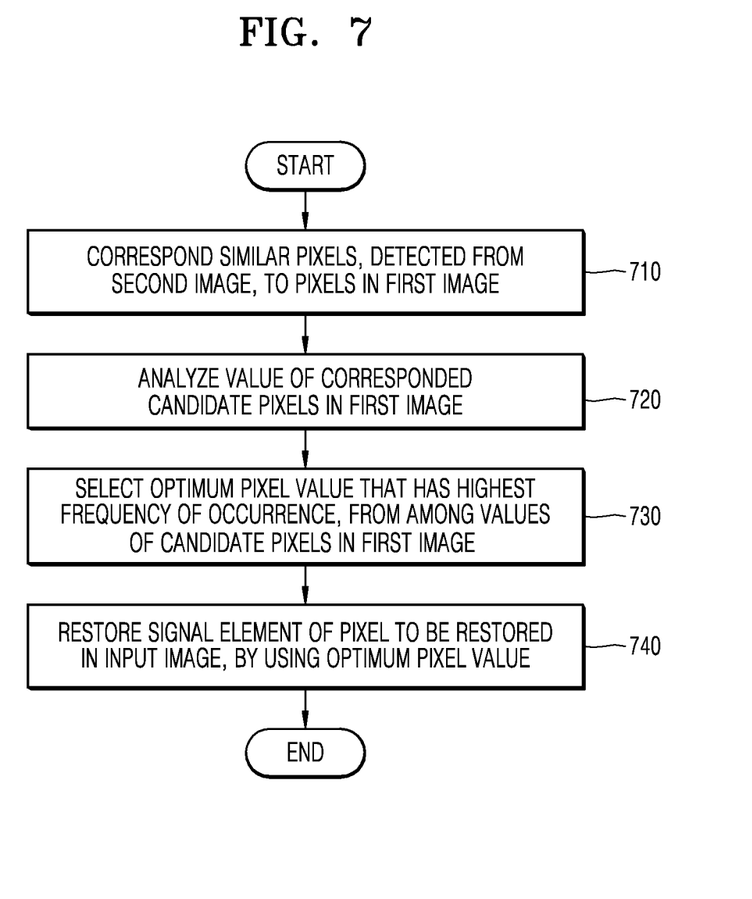
FIG. 7 is a flowchart for explaining a method of changing a value of a pixel of an input image according to an exemplary embodiment.

FIG. 7 is a flowchart for explaining a method of changing a value of a pixel to be restored in an input image according to an exemplary embodiment.

In operation 710, the image-quality improvement apparatus 100 corresponds the candidate pixels, which are detected from the second image, to the pixels in the first image. The candidate pixels that correspond to the similar pixels may include pixels that have the same coordinate value in each image. In other words, the candidate pixels may include pixels that are located at the same position in each image.

In operation 720, the image-quality improvement apparatus 100 analyzes a value of the candidate pixels in the first image, which correspond to the similar pixels. According to an exemplary embodiment, a value of the candidate pixels in the first image may be determined by analyzing the pixel value.

In operation 730, the image-quality improvement apparatus 100 extracts an optimum pixel value, which shows the highest frequency of occurrence from among values of the candidate pixels in the first image which correspond to the similar pixels, based on the value of the candidate pixels in the first image, which is analyzed in operation 720.

According to an exemplary embodiment, a pixel value that has the highest frequency of occurrence is selected from the candidate pixels. It is most likely that the optimum pixel value having the highest frequency of occurrence has a signal element appropriate to restore the input image.

However, a method of extracting a pixel value is not limited thereto. As an example, pixel values of which frequency of occurrence is equal to or higher than a preset value from among values of the candidate pixels are extracted Thus, an average of the extracted pixel values may be used to restore a lost signal element of the pixel to be restored.

In operation 740, the image-quality improvement apparatus 100 restores a lost signal element of the pixel to be restored in the input image, by using the pixel value that is extracted in operation 730.

According to an exemplary embodiment, a value of the pixel to be restored in the input image may be changed to the extracted optimum pixel value. Additionally, the value of the pixel to be restored in the input image may be changed to a value that is obtained by applying a preset weight factor to the value of the pixel to be restored and the extracted optimum pixel value.

The value of the pixel to be restored may be changed by using a high-frequency element that is extracted from a candidate pixel in the first image, which has the extracted optimum pixel value, and a similar pixel in the second image, which corresponds to the candidate pixel in the first image.

Figure 8:
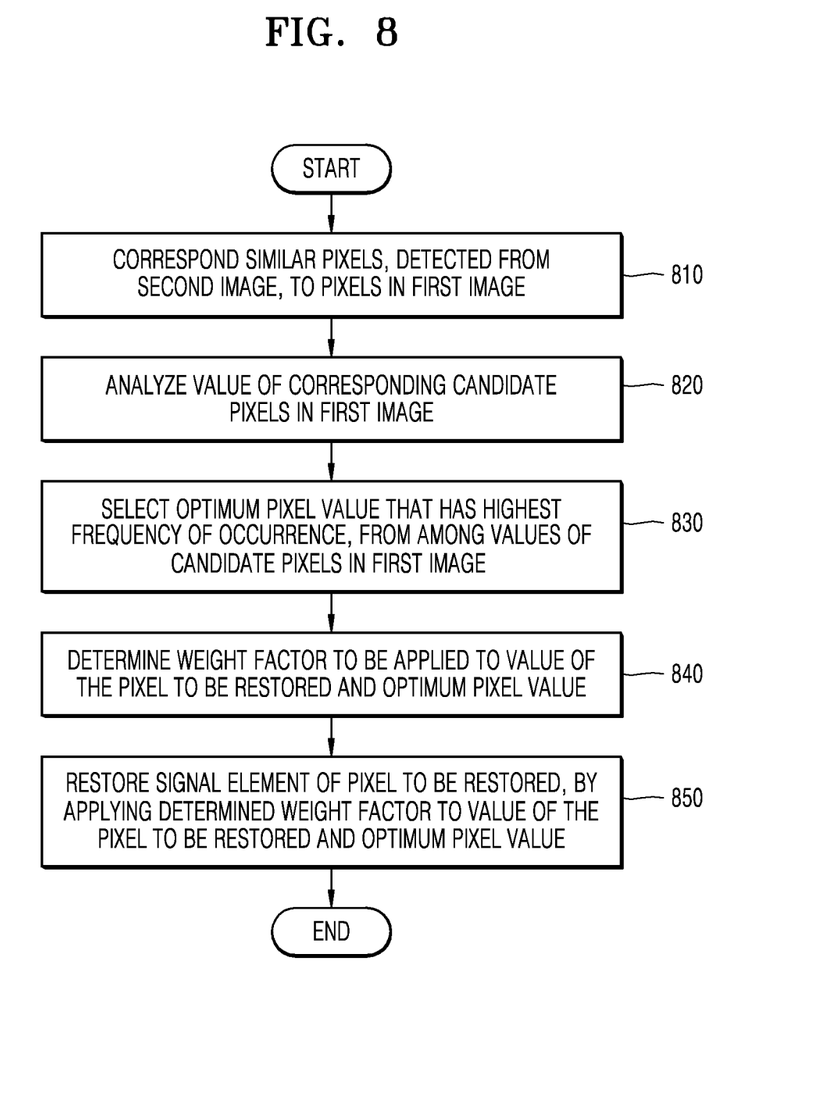
FIG. 8 is a flowchart for explaining a method of changing a value of a pixel of an input image by applying a weight factor, according to an exemplary embodiment.

FIG. 8 is a flowchart for explaining a method of changing a value of a pixel of an input image by applying a weight factor, according to an exemplary embodiment.

In operation 810, the image-quality improvement apparatus 100 corresponds candidate pixels, which are detected from the second image, to the pixels in the first image. The candidate pixels that correspond to the similar pixels may include pixels that have the same coordinate value in each image. In other words, the candidate pixels may include pixels that are located at the same position in each image.

In operation 820, the image-quality improvement apparatus 100 analyzes a value of the candidate pixels in the first image, which correspond in operation 710. According to an exemplary embodiment, a value of the candidate pixels in the first image may be checked by analyzing the pixel value.

In operation 830, the image-quality improvement apparatus 100 extracts an optimum pixel value, which shows the highest frequency of occurrence among values of the corresponding candidate pixels in the first image, based on the value of the candidate pixels in the first image, which is analyzed in operation 820.

According to an exemplary embodiment, since it is most probable that an optimum pixel value, which has the highest frequency of occurrence, has a signal element that is appropriate to restore the input image, a pixel value that has the highest frequency of occurrence is selected.

However, a method of extracting a pixel value is not limited thereto. As an example, pixel values of which frequency of occurrence is equal to or higher than a preset value are extracted from among values of the candidate pixels, and an average of the extracted pixel values may be used to restore a lost signal element of the pixel to be restored.

In operation 840, the image-quality improvement apparatus 100 determines a weight factor that will be applied to the optimum pixel value, which is extracted in operation 830, and the value of the pixel to be restored in the input image.

As a result of analyzing the input image, if it is determined that the pixel to be restored is included in an edge area, a weight factor of the optimum pixel value may be set to be higher than a value of the pixel to be restored. This is because it is expected that a loss of the high-frequency element is relatively great in the edge area.

As a result of the analyzing of the input image, an area in which a difference between values of pixels that constitute the input image is equal to or greater than a threshold may be determined to be an edge.

As a result of the analyzing of the input image, if it is determined that the pixel to be restored is not included in the edge area, a weight factor of the value of the pixel to be restored may be set to be higher than a weight factor of the optimum pixel value. This is because if the pixel to be restored is not in the edge area, it is expected that a loss of the high-frequency element is relatively small.

In operation 850, the image-quality improvement apparatus 100 applies the weight factor, which is determined in operation 840, to the value of the pixel to be restored in the input image and the extracted optimum pixel value, so as to change the value of the pixel to be restored. The value of the pixel to be restored may be changed to a value that is obtained by separately multiplying the determined weight factor by each of the value of the pixel to be restored and the optimum pixel value and adding resultant values to each other.

Figure 9:
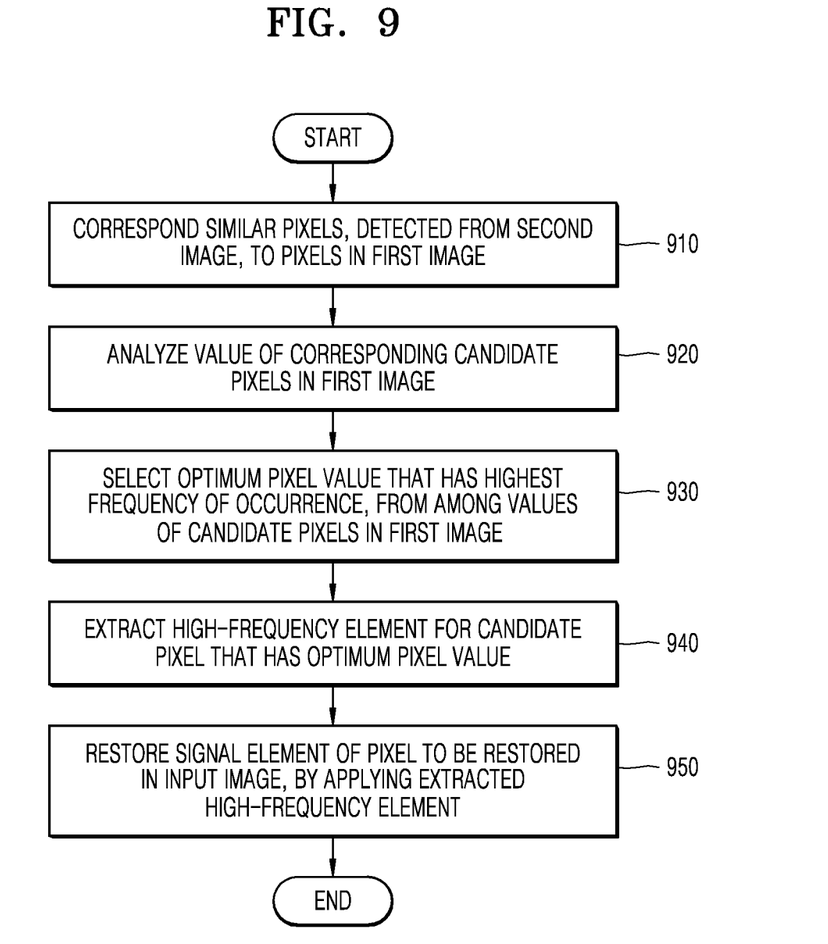
FIG. 9 is a flowchart for explaining a method of changing a value of a pixel of an input image by using a high-frequency element, according to an exemplary embodiment.

FIG. 9 is a flowchart for explaining a method of changing a value of a pixel of an input image by using a high-frequency element, according to an exemplary embodiment.

In operation 910, the image-quality improvement apparatus 100 corresponds candidate pixels, which are detected from the second image, to the pixels in the first image. The candidate pixels that correspond to the similar pixels may include pixels that have the same coordinate value in each image. In other words, the candidate pixels may include pixels that are located at the same position in each image.

In operation 920, the image-quality improvement apparatus 100 analyzes a value of the candidate pixels in the first image, which are corresponded in operation 910. According to an exemplary embodiment, a value of the candidate pixels in the first image may be checked by analyzing the pixel value.

In operation 930, the image-quality improvement apparatus 100 extracts an optimum pixel value, which shows the highest frequency of occurrence among values of the corresponding candidate pixels in the first image, based on the value of the candidate pixels in the first image, which is analyzed in operation 920.

According to an exemplary embodiment, since it is most probable that the optimum pixel value, which has the highest frequency of occurrence, has a signal element that is appropriate to restore the input image, a pixel value that has the highest frequency of occurrence is selected.

However, a method of extracting a pixel value is not limited thereto. As an example, pixel values of which frequency of occurrence is equal to or higher than a preset value are extracted from among values of the candidate pixels, and an average of the extracted pixel values may be used to restore a lost signal element of the pixel to be restored.

In operation 940, the image-quality improvement apparatus 100 extracts a high-frequency element from the pixel in the first image, which has the optimum pixel value that is extracted in operation 930. The high-frequency element may include a difference between a value of a pixel of the first image, which has the optimum pixel value, and a value of a candidate pixel of the corresponding second image.

In operation 950, the image-quality improvement apparatus 100 may restore a lost signal element of the input image by adding the high-frequency element, which is extracted in operation 940, to a value of the pixel to be restored.

In addition, other exemplary embodiments can also be implemented through computer readable code/instructions in/on a medium, e.g., a computer readable medium, to control at least one processing element to implement any above described exemplary embodiments. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the exemplary embodiments, reference has been made to the exemplary embodiments illustrated in the drawings, and specific language has been used to describe these exemplary embodiments. However, no limitation of the scope of the exemplary embodiments is intended by this specific language, and the embodiments should be construed to encompass all exemplary embodiments that would normally occur to one of ordinary skill in the art.

The present exemplary embodiments may be described in terms of functional block components and various processing steps. Such functional blocks may be realized by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the exemplary embodiments could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the exemplary embodiments and are not intended to otherwise limit the exemplary embodiments in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless the element is specifically described as "essential" or "critical".

The use of the terms "a" and "an" and "the" and similar referents in the context of describing the exemplary embodiments are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the exemplary embodiments and does not pose a limitation on the scope of the exemplary embodiments unless otherwise claimed. Additionally, it will be understood by those of ordinary skill in the art that various modifications, combinations, and changes can be formed according to design conditions and factors within the scope of the attached claims or the equivalents.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. An image-quality improvement method, comprising:
   generating a first image, obtained by downsizing an input image, and a second image, obtained by reducing a high-frequency element of the first image;
   detecting at least one second pixel from the second image based on a difference between a value of the at least one second pixel and a value of at least one input pixel from the input image, by comparing the second image to the input image; and
   changing the value of the at least one input pixel in the input image by using a value of the at least one first pixel in the first image, which is located in a location that corresponds to a location of the detected at least one second pixel in the second image.

2. The image-quality improvement method of claim 1, wherein the generating includes determining a degree in which a high-frequency element of the first image is reduced based on a degree in which a high-frequency element of the input image is reduced from an original image.

3. The image-quality improvement method of claim 1, wherein the detecting includes detecting at least one second pixel and at least one input pixel, where the value of the at least one second pixel and the value of the at least one input pixel is less than a preset reference value.

4. The image-quality improvement method of claim 1, wherein the detecting includes specifying a plurality of input pixels in a first domain having a preset size in the input image and a plurality of second pixels in a second domain having a preset size in the second image, and
   the preset sizes of the first domain and the second domain are the same.

5. The image-quality improvement method of claim 4, wherein the detecting comprises:
   determining the specified plurality of input pixels in the first domain and the specified plurality of second pixels in the second domain which correspond to each other; and
   determining whether a sum of differences of the value of the at least one second pixel and the value of the corresponding at least one input pixel is less than a preset reference value,
   wherein the specified plurality of input pixels in the first domain and the specified plurality of second pixels in the second domain are located at a corresponding location in the first domain and the second domain.

6. The image-quality improvement method of claim 4, wherein the detecting further comprises moving the second domain having the preset size in the second image, and
   wherein the plurality of second pixels in the moved second domain and the plurality of input pixels in the first domain of the input image are compared to each other.

7. The image-quality improvement method of claim 1, wherein the changing comprises:
   determining at least one first pixel in the first image which correspond to the at least one second pixel in the second image;
   extracting a value of the at least one first pixel which has a highest frequency of occurrence from among the at least one corresponding pixel in the first image; and
   determining a value of the at least one input pixel in the input image by using an extracted value of the at least one first pixel.

8. The image-quality improvement method of claim 7, wherein the determining the value of the at least one input pixel comprises changing the value of the at least one input pixel in the input image to the extracted value of the at least one first pixel.

9. The image-quality improvement method of claim 7, wherein the determining the value of the at least one input pixel comprises changing the value of the at least one input pixel in the input image to a weight value that is obtained by applying a preset weight factor to the each value of the at least one input pixel and the extracted value of the at least one first pixel.

10. The image-quality improvement method of claim 7, wherein the determining the value of the at least one input pixel comprises changing the value of the at least one input pixel in the input image by using a high-frequency element that is extracted from the at least one first pixel in the first image and the at least one second pixel in the second image, which corresponds to the at least one first pixel in the first image.

11. An image-quality improvement apparatus comprising at least one hardware processor which implements:
    a generation unit configured to generate a first image, and a second image;
    a detection unit configured to detect at least one second pixel from the second image based on a difference between a value of the at least one second pixel and a value of at least one input pixel from the input image, by comparing the second image to the input image; and
    an image-quality improvement unit configured to change the value of the at least one input pixel in the input image by using a value of the at least one first pixel in the first image, which is located in a position that correspond to a location of the detected at least one second pixel in the second image.

12. The image-quality improvement apparatus of claim 11, wherein the generation unit is configured to determine a degree in which a high-frequency element of the first image is reduced based on a degree in which a high-frequency element of the input image is reduced from an original image.

13. The image-quality improvement apparatus of claim 11, wherein the detection is configured to detect at last one second pixel and at least one input pixel, where the value of the at least one second pixel and the value of the at least one input pixel is less than a preset reference value.

14. The image-quality improvement apparatus of claim 11, wherein the detection unit is configured to specify a plurality of input pixels in a first domain having a preset size in the input image and a plurality of second pixels in a second domain having a preset size in the second image, and the preset sizes of the first domain and the second domain are the same.

15. The image-quality improvement apparatus of claim 14, wherein the detection unit is configured to determine the specified plurality of input pixels in the first domain and the specified plurality of second pixels in the second domain which correspond to each other, and determine whether a sum of differences of the value of the at least one second pixel and the value of the corresponding at least one input pixel is less than a preset reference value,
   wherein the specified plurality of input pixels in the first domain and the specified plurality of second pixels in the second domain are located at a corresponding location in the first domain and the second domain.

16. The image-quality improvement apparatus of claim 14, wherein the detection unit is configured to move the second domain having the preset size in the second image, wherein the plurality of second pixels in the moved second domain and the plurality of input pixels the first domain of the input image are compared to each other.

17. The image-quality improvement apparatus of claim 11, wherein the image-quality improvement unit comprises:
   a correspondence unit configured to determine at least one first pixel in the first image which correspond to the at least one second pixel in the first image;
   an analyzing unit configured to extract a value of the at least one first pixel which has a highest frequency of occurrence from among the at least one corresponding pixel in the first image; and
   a determination unit configured to determine a value of the at least one input pixel in the input image by using an extracted value of the at least one first pixel.

18. The image-quality improvement apparatus of claim 17, wherein the determination unit is configured to change the value of the at least one input pixel in the input image to the extracted value of the at least one first pixel.

19. The image-quality improvement apparatus of claim 17, wherein the determination unit is configured to change the value of the at least one input pixel in the input image to a weight value that is obtained by applying a preset weight factor to the each value of the at least one input pixel in the input image and the extracted value of the at least one first pixel.

20. The image-quality improvement apparatus of claim 17, wherein the determination unit is configured to change the value of the at least one input pixel in the input image by using a high-frequency element that is extracted from the at least one first pixel in the first image and the at least one second pixel in the second image, which corresponds to the at least one first pixel in the first image.

21. A non-transitory computer-readable medium having stored thereon a computer program, which when executed by a computer, performs the method of claim 1.

* * * * *